United States Patent [19]

Nicks et al.

[11] Patent Number: 4,552,908

[45] Date of Patent: Nov. 12, 1985

[54] WATER-DILUTABLE AQUEOUS COATING COMPOSITIONS

[75] Inventors: Peter F. Nicks, Maidenhead, England; Gillian A. Young, Toronto, Canada

[73] Assignee: Imperial Chemical Industries PLC, London, England

[21] Appl. No.: 641,777

[22] Filed: Aug. 17, 1984

[30] Foreign Application Priority Data

Aug. 30, 1983 [GB] United Kingdom ............... 8323241

[51] Int. Cl.⁴ .................. C09D 5/40; C09D 3/64; C09D 5/02; C09D 3/72
[52] U.S. Cl. .................................................. 523/504
[58] Field of Search ............... 523/504; 204/181 C

[56] References Cited

U.S. PATENT DOCUMENTS

| | | | |
|---|---|---|---|
| Re. 28,474 | 7/1974 | Anderson et al. | 523/336 |
| Re. 28,576 | 10/1975 | Anderson et al. | 523/336 |
| 3,251,816 | 5/1966 | Furendal et al. | 526/911 |
| 3,284,393 | 11/1966 | Vanderhoff et al. | 526/911 |
| 3,450,655 | 6/1969 | Spiller | 524/901 |
| 3,714,100 | 1/1973 | Biale et al. | 524/748 |
| 3,862,894 | 1/1975 | McGuire et al. | 204/181 C |
| 3,891,527 | 6/1975 | Sekmakas | 204/181 C |
| 3,997,492 | 12/1976 | Kane et al. | 524/812 |
| 4,077,930 | 3/1978 | Lim et al. | 526/305 |
| 4,138,376 | 2/1979 | Nicks | 524/872 |
| 4,363,886 | 12/1982 | Lipowski et al. | 524/801 |
| 4,373,054 | 2/1983 | Gibson et al. | 524/901 |

Primary Examiner—Ronald W. Griffin
Attorney, Agent, or Firm—Cushman, Darby & Cushman

[57] ABSTRACT

Aqueous coating compositions comprise a polymer of defined molecular weight which contains either anionizable or cationizable groups and also certain defined non-ionizable water-soluble moieties (derived for example from polyethylene glycol), water, optionally an organic coupling solvent and optionally either base or acid. The presence of regularly distributed non-ionizable water-soluble moieties enables the selection of aqueous polymer solutions which, on dilution, show a regular relationship between viscosity and solids content. The polymer solutions are useful in the formulation of coating compositions, particularly paints.

10 Claims, 1 Drawing Figure

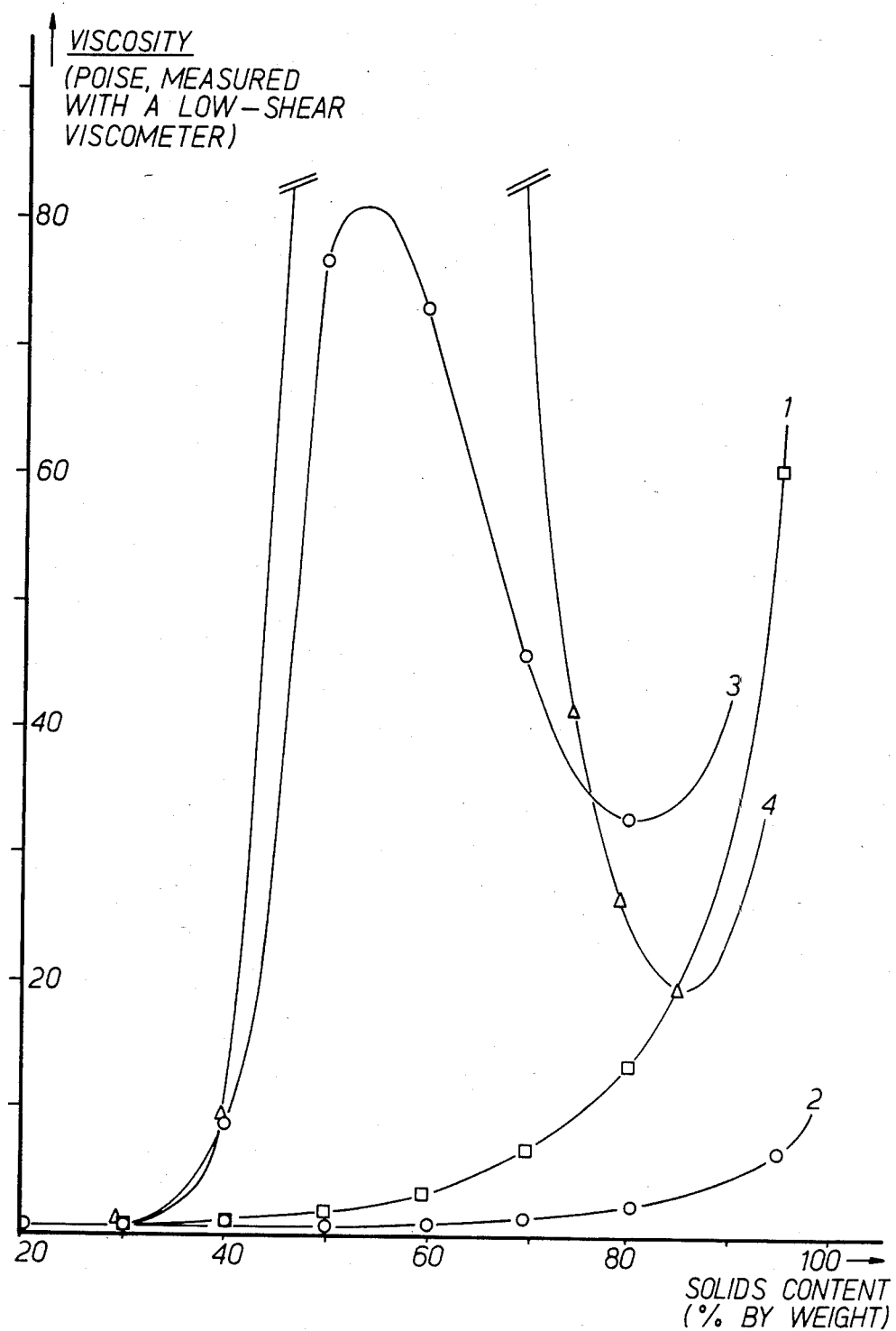

WATER-DILUTABLE AQUEOUS COATING COMPOSITIONS

This invention relates to water-dilutable aqueous coating compositions, particularly to paint compositions, and to polymers for use therein.

It is well known to employ a polymer containing carboxyl groups as a film-forming component of water-dilutable aqueous coating compositions. Generally these carboxyl groups are at least partially neutralised by a base such as an amine and the composition normally comprises also a proportion of an organic cosolvent, usually of higher boiling point than water, in order to improve the solubility and rheological characteristics of the polymer in the aqueous phase.

Water-dilutable compositions are preferred to compositions based wholly on organic solvents such as white spirit for reasons of reduced cost, reduced toxicity and increased safety; and paints which yield coatings having a high level of gloss may be based on this type of composition. However, a solution of film-forming polymer in an organic solvent, such as of an alkyd resin in white spirit, exhibits a uniform solids content/viscosity relationship when diluted with the same solvent; whereas an aqueous solution of a polymer containing carboxyl groups, for example an addition copolymer or a polyester such as are available commercially for use in coating compositions, does not show a uniform relationship when diluted with water. When a solution in a water-miscible cosolvent (e.g. a glycol ether) of a carboxyl group-containing polymer is progressively diluted with water from an initial polymer concentration of about 70% by weight in the co-solvent to a final polymer concentration of about 20% by weight in the diluted co-solvent, it is observed that the viscosity of the diluted solution passes through a minimum and then through a maximum before a uniform relationship between the solids content and the viscosity of the solution is resumed.

This anomalous behaviour on dilution with water of solutions of carboxyl-containing polymers in organic co-solvent has been discussed by Overton & Herb in Journal of Coatings Technology, 55 (No. 700) May 1983, at page 33. It is a significant problem in the formulation of aqueous coating compositions which contain carboxyl group-containing polymers since it can occur over the wide range of solids concentration at which these compositions are used. There is a particular problem in the case of paints because the anomalous behaviour occurs in that region of polymer solids content which is most preferred for satisfactory application of paint to a substrate with a brush or by spray. When a paint is applied to a substrate and the aqueous phase gradually evaporates, assuming that the cosolvent present has a boiling point greater than that of water, the composition of the drying paint—and hence its rheology—follows in reverse the course which is followed when a solution of the polymer in the cosolvent is diluted with water. Thus there is reached a stage at which there is a rapid viscosity rise leading to stickiness of application, followed by a temporary fall in the viscosity of the applied composition which causes paint applied to a vertical substrate to sag and to yield a final dry film of uneven thickness.

The problem can be avoided by formulating a coating composition at a very low solids content, but very thin coating films are then obtained and the application properties of this composition are unsatisfactory. The problem can be alleviated to some extent by increasing the number of carboxyl groups and the extent to which they are neutralised by a base. However, this must always be a compromise since an increase in the number of carboxyl groups and in the degree of neutralisation increases the water-sensitivity of the final coating, and also the viscosity of the coating composition may be too high at a preferred polymer solids content. The problem is usually alleviated by the use of a cosolvent which is miscible with, and is of higher boiling point than, water, and normally a compromise has to be achieved between the acid value of the polymer, the degree of neutralisation and the proportion of cosolvent.

We have now found that improved aqueous coating compositions can be based on solutions of certain selected water-dispersible polymers comprising both ionisable groups and non-ionisable water-soluble moieties. These solutions do not exhibit the anomalous increase in viscosity shown by solutions based on the polymers previously used when diluted with water, and, due to the presence of both ionisable groups and non-ionisable moieties, these solutions require only a minimum amount of an organic coupling solvent. At most there will be used 150 parts of the solvent per 100 parts of polymer if any at all. We have found, with regard to paints in particular, that compositions of this type can be formulated for application to a substrate by brush which have improved application properties such as "brushability", "lapping" with composition which has been previously applied and flow-out of brush marks.

According to this invention we provide a water-dilutable aqueous coating composition which comprises :

(A) X parts of a water-dispersible film-forming polymer of molecular weight in the range 2,000–30,000, the polymer comprising
  (a) anionisable groups, at least partially neutralised with a base when required, selected from —COOH, —SO$_3$H and —PO$_4$H$_2$, or cationisable groups, at least partially neutralised with an acid when required, of structure —NR$_1$R$_2$ where R$^1$ and R$^2$ are H or C$_{1-18}$ alkyl or substituted alkyl groups, the same or different, or R$_1$ and R$_2$ represent part of a cyclic structure, and
  (b) non-ionisable water-soluble moieties selected from moieties of polyethylene glycol or its monoethers, of molecular weight not greater than 1,000; and moieties of poly(meth)acrylamide, of polyvinylpyrrolidone or of poly 2-ethyl oxazoline and its hydrolysates, all being of molecular weight not greater than 2,000.
(B) Y parts of an organic coupling solvent for the film-forming polymer which has a boiling point greater than that of water, where Y=X(Z/100), Z being in the range 0–150, and
(C) water, which is characterised in that when a solution of X parts of the water-dispersible polymer in Y parts of the organic coupling solvent or, when Y=O, in water is progressively diluted with water, there is no increase in viscosity of the diluted aqueous solution as measured at 25° C. by a low shear viscometer.

The invention also provides a water-dispersible film-forming polymer suitable for use in the above aqueous coating composition which has a molecular weight in the range 2,000–30,000 and comprises :
  (a) anionisable groups selected from —COOH, —SO₃H, —PO₄H₂ or cationisable groups of structure —NR₁R₂, where $R^1$ and $R^2$ are H or $C_{1-18}$ alkyl or substituted alkyl groups the same or different, or $R_1$ and $R_2$ represent part of a cyclic structure, and (b) non-ionisable water-soluble moieties selected from moieties of polyethylene glycol or its monoethers of molecular weight not greater than 1,000; and moieties of poly(meth)acrylamide, of polyvinylpyrrolidone or of poly 2-ethyl oxazoline and its hydrolysates, all being of molecular weight not greater than 2000.

The invention also provides a water-dilutable paint which comprises a water-dilutable coating composition as defined above.

By the term "organic coupling solvent" we mean any organic liquid, or mixture of liquids (including a blend of water-immiscible liquid and water-miscible liquid), present in the coating composition which forms a homogeneous mixture with the water dispersible polymer and water and which has a boiling point greater than water, i.e. greater than 100° C. The liquid should be inert towards the other ingredients of the composition.

Other inert organic liquids of boiling point 100° C. or less which may also be present in the composition are to be disregarded in the characterising dilution/viscosity test mentioned above, and the test should be performed in their absence.

Suitable organic coupling solvents of boiling point greater than 100° C. include alcohols, glycols, ester alcohols, ether alcohols and the esters of ether alcohols for example : n-butanol, 2-pentanol, ethylene glycol, benzyl alcohol, 2,2,4 trimethylpentane 1,3 diol-monoisobutyrate, ethylene glycol monomethyl, -ethyl, -propyl, -butyl and -hexyl ethers, propylene glycol monomethyl, -ethyl, -propyl and -butyl ethers, diethylene glycol, dipropylene glycol, dipropylene glycol methyl ether, diethylene glycol ethyl ether, ethylene glycol monomethyl ether acetate and propylene glycol monomethyl ether acetate.

It is preferred to use propylene glycol ethers and their ester derivatives because they are of low odour, good solvency and low toxicity.

Whilst compositions according to the invention may be free from organic coupling solvent, in general we find that a certain proportion of solvent is usually necessary but that the selection of film-forming polymers comprising both ionisable and non-ionisable water-soluble groups which satisfy the characterising test keep this proportion to a minimum. In general there may be present in the composition at least 5 parts of organic coupling solvent/100 parts of polymer but there will be present not more than 150 parts of this solvent/100 parts of polymer.

The water-dispersible film-forming polymer may be selected from a wide range of chemical types, for example vinyl or acrylic addition polymers, polyesters, polyurethanes, polyureas, polyamides, polyethers or epoxides.

Preferably the water-dispersible film-forming polymer is of a type which permits the regular distribution of the ionisable and non-ionisable water-soluble groups along its length.

Particularly preferred types of film-forming polymer, for this reason, are vinyl or acrylic addition polymers, polyesters, polyurethanes and polyureas, which are prepared by procedures enabling good control of molecular weight. Preferably the molecular weight is less than 20,000 more preferably less than 15,000.

Suitable bases which can be used to at least partially neutralise anionisable groups, when these groups are present and when neutralisation is required, are inorganic bases such as sodium hydroxide, potassium hydroxide and ammonia; and organic bases such as amines, for instance dimethyl aminoethanol, triethylamine, dibutylamine or morpholine.

Suitable acids which can be used to at least partially neutralise cationisable groups, when these groups are present and when neutralisation is required, are inorganic acids such as hydrochloric, phosphoric, boric, sulphuric and sulphonic acids; and organic acids such as acetic, lactic, formic and glycollic acids.

Different levels of water-soluble groups are preferred for different polymer types, depending on the hydrophilicity or hydrophobicity of the backbone polymer and the solubility of the water-soluble groups selected. However in general, the level of ionisable groups is in the range 0.3–3.6 moles/kg of polymer and the non-ionisable water-soluble moieties are present in a total proportion of 0.5–40% by weight of the polymer.

We have found that there is an optimum distribution of the total weight of non-ionisable water-soluble material present and the number of distinct moieties present in a polymer which comprise such material. For example, in the polyester of Example 1 there is present a total of 54% by weight based on the film-forming polymer of moieties of methoxypolyethylene glycol, and only when this is contained in individual non-ionisable groups of molecular weight about 600 or less does the polymer solution satisfy the dilution/viscosity test and is therefore within the scope of this invention.

It is a general principle that the non-ionisable water-soluble moieties should be evenly distributed throughout the polymer, i.e. the ratio of the number of soluble groups to the total weight of non-ionisable water-soluble material should be high. More specifically, the quantity and molecular weight of the non-ionisable water-soluble moieties should be such that, on average, there is more than one water-soluble group of this type per polymer molecule.

In the formulation of water-dilutable paints according to this invention, one important characteristic of a suitable water-dispersible polymer is that it quickly becomes insensitive to water after application to a substrate. This may be achieved by minimising the proportions of ionisable groups (and the degree of neutralisation) and non-ionisable water-soluble moieties, and balancing this by an increasing proportion of organic coupling solvent; and/or by the incorporation of cross-linkable groups e.g. autoxidisable groups, or crosslinking agents which subsequently produce a complex structure.

A preferred polymer containing anionisable groups for use in such paints is an acrylic addition copolymer of molecular weight in the range 6,000–12,000 which comprises carboxyl groups and moieties of a polyethylene glycol(introduced for example, by using methoxypolyethylene glycol (meth)acrylate as a comonomer) of molecular weight in the range 200–550, the total weight of the non-ionisable material not exceeding 20% and, preferably not exceeding 10% by weight based on the weight of the film-forming polymer, and the acid value in the range 20–200 mg KOH/g, preferably 50–120 mg KOH/g.

Another preferred polymer containing anionisable groups is an acrylic addition copolymer containing carboxyl groups as above, and comprising moieties of poly(meth)acrylamide at a level not exceeding 20% and preferably not exceeding 10% by weight of the polymer.

Typical acid comonomers for use in preparing a suitable film-forming addition polymer, in conjunction with for example a poly(meth)acrylamide-containing derivative of (meth)acrylic acid or methoxypolyethylene glycol (meth)acrylate, include (meth)acrylic acid, itaconic acid, citraconic acid, crotonic acid, sorbic acid and fumaric acid. Typical additional comonomers include for instance methyl methacrylate, butyl acrylate, ethyl acrylate, 2-ethylhexyl acrylate, lauryl methacrylate, styrene and methyl styrene, vinyl acetate, vinyl chloride, vinylidene chloride, acrylonitrile and allyl alcohol. Particularly suitable polymers are those comprising (meth)acrylic acid, with methyl methacrylate, butyl acrylate and/or 2-ethylhexyl acrylate.

A preferred polymer containing cationisable groups is an acrylic copolymer of molecular weight in the range 6,000–12,000 which comprises amine groups and moieties of polyethylene glycol, for instance methoxy polyethylene glycol of molecular weight in the range 200–550 (350), and/or moieties of poly(meth)acrylamide, the total weight of the non-ionic water-soluble material not exceeding 20% by weight of the polymer (10%), and the amine value 20–200 mg KOH/g, preferably 50–120 mg KOH/g.

Typical basic comonomers for use in preparing a suitable polymer include dimethylaminoethyl methacrylate, 2-vinyl pyridine, 4-vinyl pyridine, 3-dimethylamino acrylonitrile. Typical additional comonomers include for instance methyl methacrylate, butyl acrylate, ethyl acrylate, ethylhexyl acrylate, lauryl methacrylate, styrene, 2-methyl styrene, vinyl acetate, vinyl chloride, vinylidene chloride, acrylonitrile and allyl alcohol.

The non-ionisable water-soluble moieties of poly(meth)acrylamide, polyvinylpyrrolidone and poly 2-ethyl oxazoline which are specified as useful in this invention are not discussed or exemplified in the same detail as moieties of polyethylene glycol but bearing in mind their similar properties, it is believed that their behaviour will be broadly similar to that of the polyethylene glycol moieties.

The aqueous coating compositions of this invention may be used in a wide variety of applications. Although they are of primary value in the formulation of water-dilutable paints they may also find use in the formulation of adhesives, horticultural compositions, pharmaceutical compositions etc.

The compositions may comprise other materials such as other polymers and additives appropriate to the above applications, for example pigments, fillers, cross-linking agents, anti-skinning agents, slip aids etc.

The invention is illustrated by the following Examples in which parts and percentages are by weight.

EXAMPLE 1

This Example describes the preparation of a series of four polyesters, each of molecular weight (weight average) in the range 4,000–6,000, which contain carboxyl groups and water-soluble moieties of methoxy polyethylene glycol of molecular weight varying in the range 350–2000. The graphs in the accompanying drawing illustrate the importance of the molecular weight of each water-soluble moiety, for a given total weight of such moieties present, in determining the rheology of an aqueous solution of the polyester.

With reference to Table 1 below, four polyesters, Reference Numbers 1–4, were prepared by reacting a parts of adipic acid, b parts of dimethylolpropionic acid, c parts of neopentyl glycol and d parts of a methoxy polyethylene glycol (approximately the same weights in each case but see Table 1 for the different molecular weight in each case) in a reaction flask fitted with a stirrer, thermometer, steam condenser and a Dean & Stark trap and connected to a nitrogen supply. 0.3% of isopropyl titanate and 3% of toluene (each by weight based on the total weight of reactants) were added and the mixture refluxed at 190° C. until reaction was substantially complete.

TABLE 1

| Reactants ref. | Molecular weight of methoxypolyethylene glycol. | | | |
|---|---|---|---|---|
| | 350 | 550 | 750 | 200 |
| | | | parts | |
| a | 657.0 | 657.0 | 657.0 | 657.0 |
| b | 469.0 | 301.5 | 227.8 | 107.2 |
| c | 52.0 | 182.0 | 239.2 | 332.8 |
| d | 1137.5 | 1100.0 | 1087.5 | 1140.0 |
| Polyester reference no. | 1 | 2 | 3 | 4 |

The resulting polyesters each had a molecular weight (weight average) in the range 4,000–6,000 and an acid value in the range 25–45 mg KOH/g. Each was dispersed in the absence of base in distilled water to give a range of sample solutions of solids content (by weight) in the range 20–95%. The viscosity of each sample was measured at 25° C. with a Brookfield low-shear viscometer and this viscosity was plotted against the corresponding solids content as shown in the accompanying drawing.

It will be noted that only solutions of polyesters Reference Nos. 1 and 2 show no increase in viscosity on dilution with water and therefore only these solutions are useful in coating compositions according to the invention. This was achieved in the absence of organic coupling solvent and ' of neutralising base.

EXAMPLE 2

(a) This Example describes the preparation of three polyesters of molecular weight (weight average) in the range 4,000–6,000 by the procedure of Example 1 but the methoxypolyethylene glycol was of molecular weight 550 in each case and the proportions used were varied.

The polyesters were prepared as described, and using the same components a, b, c & d as in Example 1. The proportions of the components are given in Table 2.

TABLE 2

| Reactants ref. | % weight of moiety of methoxypolyethylene glycol. mol. wt. 550 | | |
|---|---|---|---|
| | 53.4% | 46.4% | 36.7% |
| | (based on total weight of polymer) | | |
| a | 657.0 | 657.0 | 657.0 |
| b | 301.5 | 234.5 | 167.5 |
| c | 182.0 | 234.5 | 286.0 |
| d | 1100.0 | 825.0 | 550.0 |
| Polyester reference no. | 5 | 6 | 7 |

The resulting polyesters all had a molecular weight (weight average) in the range 4,000–6,000 and an acid value in the range 35–60 mg KOH/g. Each was dispersed in the absence of base in distilled water to give a range of sample solutions of solids content (by weight) in the range 20–95%. The viscosity of each sample was measured at 25° C. with a Brookfield visco-meter and this viscosity was plotted against the corresponding solids content, as illustrated for Example 1.

It was found that only solutions of polyester Reference No. 5 showed no increase in viscosity on dilution with water. Therefore only this solution is useful in a coating composition according to the invention. This was achieved in the absence of coupling solvent and ' of neutralising base. (b) Four further polyesters, Reference Nos. 8, 9, 10, and 11, in which the proportions of methoxypolyethylene glycol were respectively 29.8%, 35.5%, 45.0% and 53.8% by weight, were prepared by the procedure of Example 1, but using methoxy polyethylene glycol of molecular weight 350. It was found from a plot of viscosity/solids content that only the solutions of polyesters 10 and 11 are useful in a coating composition according to the invention. This was achieved in the absence of organic coupling solvent and ' of neutralising base.

EXAMPLE 3

This Example describes the preparation of a series of polyesters by a two-stage process in which only components a, b, and c of the polyester described in Example 1 were co-reacted in a first stage and in a second stage the resulting polyester was post-esterified with different amounts of an allyloxypolyethylene glycol in which the polyethylene glycol moiety had a molecular weight of 300, 0.1% of Fascat 4101 (commercially available from M & T Chemicals) was used as catalyst instead of the isopropyl titanate of Example 1. The proportions a, b and c of the components of the first stage polyester are given in Table 3. They were co-reacted until an acid value x mg KOH/g was reached. d parts of the allyloxypolyethylene glycol were added to the product of the first stage and the mixture refluxed at 210°–220° C. until reaction was complete.

The resulting polyesters each had a molecular weight (weight average) in the range 6,000–7,000 and an acid value in the range 50–80 mg KOH/g. They were neutralised with di-methylaminoethanol to 105% of the final acid value. They were each diluted with distilled water to give a range of sample solutions varying in solids content from 20% to 90% and their viscosities measured using a Brookfield low-shear viscometer. It was found from a plot of viscosity against solids content, as described in Example 1, that only the solutions of polyesters Reference Nos. 12, 13, 14 and 15 were useful in a coating composition according to the invention. This was achieved in the absence of a coupling solvent.

TABLE 3

| Reactants ref. | allyloxypolyethylene glycol. mol. wt. % 350 | | | | |
|---|---|---|---|---|---|
| | 40.3 | 33.1 | 26.0 | 17.0 | 10.0 |
| a | 657.0 | 657.0 | 657.0 | 657.0 | 657.0 |
| b | 281.4 | 214.4 | 160.8 | 107.7 | 73.7 |
| c | 197.6 | 249.6 | 291.2 | 332.8 | 358.8 |
| x | 175 | 149 | 128 | 102 | 92 |
| d | 647.5 | 472.5 | 332.5 | 192.5 | 105.0 |
| Polyester reference No. | 12 | 13 | 14 | 15 | 16 |

EXAMPLE 4

This Example describes the preparation of a series of acrylic copolymers containing carboxyl groups and an increasing proportion of moieties of methoxypolyethylene glycol of molecular weight 350.

20 parts of propylene glycol monomethyl ether were charged to a reaction flask fitted with stirrer, thermometer, and reflux condenser and heated to reflux. With reference to Table 4 below, 5 parts of azodiiso-butyronitrile were added to a mixture of x parts of a 6:4 mixture of methyl methacrylate and butyl acrylate, y parts of methacrylic acid and z parts of methoxypolyethylene glycol methacrylate (in which the methoxypolyethylene glycol moiety was of a molecular weight 350). The mixture was stirred at room temperature until clear and then pumped into the reaction flask over a period of 3 hours. 30 minutes after the end of the feed 1 part of azodiisobutyronitrile was added and reflux maintained for a further 60 minutes, after which the resin was cooled and solids adjusted to 70% with additional propylene glycol monomethyl ether. The acid value of the resin was 65 mg KOH/g and the resin was neutralised with di-methylaminoethanol and, as in Example 3, distilled water was added to give a range of solutions varying in solids content from 20% to 70%. The viscosities of these solutions were measured using a Brookfield low-shear viscometer. It was found from a plot of viscosity against solids content, as described in Example 1, that only solutions of acrylic copolymers Reference Nos. 4 and 5 were useful in a coating composition according to the invention when using the specified proportion of coupling solvent, and neutralising base.

TABLE 4

| Reactants ref. | % methoxypolyethylene glycol methacrylate | | | | |
|---|---|---|---|---|---|
| | 0 | 10 | 20 | 30 | 40 |
| x | 90 | 80 | 70 | 60 | 50 |
| y | 10 | 10 | 10 | 10 | 10 |
| z | 0 | 10 | 20 | 30 | 40 |
| Acrylic copolymer | 1 | 2 | 3 | 4 | 5 |

EXAMPLE 5

This example describes the preparation of a polyurethane of molecular weight (weight average) approximately 15,000 containing carboxyl groups and moieties of methoxypolyethylene glycol of molecular weight 350; and the preparation of aqueous solutions in the presence of water-miscible and water-immiscible organic solvents.

428.8 parts of Desmodur N (a tolylene diisocyanate commercially available from Bayer; "Desmodur" is a Registered Trade Mark), 0.1 parts dibutyl tin dilaurate and 200 parts methylethyl ketone was charged to a reaction flask fitted with stirrer, thermometer and reflux condenser. 154 parts of methoxypolyethylene glycol (molecular weight 350) were added over a period of 30 minutes at 60° C. under a blanket of nitrogen gas. After heating at 60° C. for 60 minutes, 59.5 parts of ethylene glycol monoethyl ether were added to the mixture over a period of 15 minutes. After a further 60 minutes at 60° C., 73.3 parts of polypropylene glycol (molecular weight 400) were added over a period of 15 minutes. After a final period of 60 minutes at 60° C., the mixture was cooled to 10° C. and a mixture of 55 parts of glycine, 65.3 parts of dimethyl amino ethanol, 500 parts of distilled water and 150 parts of isopropyl alcohol was added rapidly with stirring. When reaction was complete, the mixture was vacuum stripped to remove all solvents, and solutions prepared at 75% solids in the following solvents (1, 2 and 3 are organic coupling solvents according to the invention):
(1) propylene glycol monomethylether
(2) benzyl alcohol
(3) the acetate of ethylene glycol monomethyl ether
(4) distilled water As in Example 4, distilled water was added to these solutions to give a range of aqueous solutions varying in solids content from 20% to 70%. The viscosities of these solutions were measured using a Brookfield low-shear viscometer. It was found that all four polymer solutions were useful in coating compositions according to the invention when a plot of viscosity against solids content was prepared.

EXAMPLE 6

This Example describes the preparation of two addition polymers each containing basic groups and different proportions of moieties of methyoxypolyethylene glycol (molecular weight 350).

The two polymers, (a) and (b), were prepared by the procedure described in Example 4, the monomer compositions (parts) being as follows:

|  | (a) | (b) |
| --- | --- | --- |
| Methyl methacrylate | 54.5 | 43.0 |
| Methoxy polyethylene glycol acrylate | 10.0 | 30.0 |
| Butyl acrylate | 25.5 | 17.0 |
| Dimethyl aminoethyl methacrylate | 10.0 | 10.0 |
|  | 100 | 100 |

The polymers were obtained as a 50% solids solution in propylene glycol monomethylether and were shown by gas phase chromatography to be of similar molecular weights in the range 5,500–6,000. Glacial acetic acid was added to bring the pH to 7 and appropriate amounts of water were added to provide a range of sample solutions from 20% to 50% solids content. It was found from a plot of viscosity against solids content, as described in Example 1, that only the aqueous solution of polymer (b) was useful in a coating composition according to the invention in the presence of organic coupling solvent and ' neutralising acid.

EXAMPLE 7

Addition polymers similar to those described in Example 4, were prepared but in which the carboxyl groups were replaced by either a molar equivalent of sulphonate groups or ' of phosphate groups. They were neutralised with ammonia, diluted with water and a plot made of viscosities corresponding to various solids contents, as described in Example 1. The solutions of polymers containing 20, 30 and 40% of methoxypolyethylene glycol moieties were in accordance with the invention when using the amounts of organic coupling solvent specified in Example 4.

EXAMPLE 8

This Example describes the preparation of a paint which employs an aqueous polymer solution according to the invention.

An aqueous gloss paint (A) was prepared by dispersing in a ball mill 61.5 parts of rutile titanium dioxide, 25 parts of a 75% solids solution in water of the polyester prepared in Example 1, Reference No. 1, and 20 parts of water. A further 88.3 parts of the polyester solution at 75% solids were added to the millbase with stirring, and the resulting paint thinned to 4 poise measured at 25° C. and at 10,000 secs$^{-1}$. A similar paint (B) was based on the polyester of Example 1, Reference No. 3.

Both paints were applied to a vertical surface by brush. Paint (A) was easy to apply and the wet edge of the paint film could be taken up after 10 minutes. The paint film showed no evidence of sagging from the thick edge. Paint (B) was more difficult to apply in that it became sticky more quickly and the wet edge of the paint film was less readily taken up than that of (A). Considerable sagging of the film occurred on loss of water due to the decrease in viscosity which occurred when the solids content increased, as is illustrated in the attached drawing with reference to Example 1.

EXAMPLE 9

When the moieties of polyethylene glycol or the monoether used in the previous Examples were replaced by moieties of poly(meth)acrylamide, polyvinylpyrrolidone or poly 2-ethyl oxazoline all of molecular weight less than 2,000, generally similar results were obtained with these moieties when they were of similar molecular weight to those moieties used in Examples which provided polymer solutions for use in the coating compositions of this invention.

We claim:

1. A water-dilutable aqueous coating composition which comprises:
(A) X parts of a water-dispersible film-forming polymer of molecular weight in the range 2,000–30,000, the polymer comprising
  (a) anionisable groups, at least partially neutralised with a base when required, selected from —COOH, —SO$_3$H and —PO$_4$H$_2$, or cationisable groups, at least partially neutralised with an acid when required, of structure —N R$^1$R$^2$, where R$^1$ and R$^2$ are H or C$_{1-18}$ alkyl or substituted alkyl groups, the same or different, or R$_1$ and R$_2$ represent part of a cyclic structure, and
  (b) non-ionisable water-soluble moieties selected from moieties of polyethylene glycol or its monoethers of molecular weight not greater than 1,000; and moieties of poly(meth)acrylamide, of polyvinylpyrrolidone or of poly 2-ethyl oxazoline and its hydrolysates, all being of molecular weight not greater than 2,000;
(B) Y parts of an organic coupling solvent for the film-forming polymer which has a boiling point greater than that of water, where Y=X(Z/100), Z being in the range 0–150, and
(C) water,
which is characterised in that when a solution of X parts of the water-dispersible polymer in Y parts of the organic coupling solvent or, when Y=0, in water is progressively diluted with water, there is no increase in viscosity of the diluted aqueous solution as measured at 25° C. by a low shear viscometer.

2. An aqueous coating composition according to claim 1 wherein the film-forming polymer has a molecular weight in the range 2,000–15,000.

3. An aqueous coating composition according to claim 1 wherein the film-forming polymer is selected from addition polymers, polyesters and polyurethanes.

4. An aqueous coating composition according to claim 1 wherein ionisable groups and non-ionisable water-soluble moieties are regularly distributed along the length of the polymer.

5. An aqueous coating composition according to claim 1 comprising a film-forming polymer having ionisable groups in the range 0.3-3.6 moles/Kg of polymer and 0.5-40% by weight of non-ionisable water-soluble moieties based on the weight of polymer.

6. An aqueous coating composition according to claim 1 wherein there is present from 5 to 150 parts of organic coupling solvent per 100 parts of film-forming polymer.

7. An aqueous coating composition according to claim 1 wherein the organic coupling solvent is selected from alcohols, glycols, ester alcohols, ether alcohols and esters of ether alcohols.

8. An aqueous coating composition according to claim 6 wherein the organic coupling solvent is a propylene glycol ether or an ester derivative thereof.

9. A water-dispersible film-forming polymer suitable for use in an aqueous coating composition according to claim 1 which has a molecular weight in the range 2,000-30,000 and comprises:
  (a) anionisable groups selected from —COOH, —SO$_3$H, —PO$_4$H$_2$, or cationisable groups of structure —N R$^1$R$^2$, where R$^1$ and R$^2$ are H or C$_{1-18}$ alkyl or substituted alkyl groups the same or different, or R$_1$R$_2$ represent part of a cyclic structure, and
  (b) non-ionisable water-soluble moieties selected from moieties of polyethylene glycol or its monoethers of molecular weight not greater than 1,000; and moieties of poly(meth)acrylamide, of polyvinylpyrrolidone or of poly 2-ethyl oxazoline or its hydrolysates, all being of molecular weight not greater than 2,000.

10. A water-dilutable paint which comprises a water-dilutable coating composition according to claim 1.

* * * * *